United States Patent
Yao et al.

(10) Patent No.: US 10,944,627 B2
(45) Date of Patent: Mar. 9, 2021

(54) LIFECYCLE MANAGEMENT PARAMETER MODELING FOR VIRTUAL NETWORK FUNCTIONS

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/338,987

(22) PCT Filed: Sep. 29, 2017

(86) PCT No.: PCT/US2017/054502
§ 371 (c)(1),
(2) Date: Apr. 2, 2019

(87) PCT Pub. No.: WO2018/084975
PCT Pub. Date: May 11, 2018

(65) Prior Publication Data
US 2020/0044919 A1    Feb. 6, 2020

Related U.S. Application Data

(60) Provisional application No. 62/416,624, filed on Nov. 2, 2016.

(51) Int. Cl.
*H04L 12/24* (2006.01)
*G06F 9/455* (2018.01)

(52) U.S. Cl.
CPC ...... *H04L 41/0806* (2013.01); *G06F 9/45558* (2013.01); *H04L 41/0233* (2013.01); *H04L 41/0893* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 6,005,566 A | * | 12/1999 | Jones | G06F 9/451 715/788 |
| 10,671,420 B2 | * | 6/2020 | Xia | H04L 41/0813 |
| 2014/0051416 A1 | * | 2/2014 | Loborg | H04W 24/10 455/418 |

FOREIGN PATENT DOCUMENTS

| WO | 2016/093861 A1 | 6/2016 |
| WO | 2016/117697 A1 | 7/2016 |

OTHER PUBLICATIONS

International Patent Office—International Search Report and Written Opinion dated Dec. 11, 2017 from International Application No. PCT/US2017/054502, 17 pages.
Huawei, "Adding procedure flow for VNF Instantiation triggered by MO Creation," 3GPP TSG SA WG5 (Telecom Management) Meeting #108, S5-164090, Agenda Item: 6.4.1.2, Jul. 11-15, 2016, Harbin (China), 4 pages.

(Continued)

*Primary Examiner* — James A Edwards
(74) *Attorney, Agent, or Firm* — Fish & Richardson P.C.

(57) ABSTRACT

Embodiments of the present disclosure describe methods and apparatuses for lifecycle management parameter modeling for virtual network functions.

25 Claims, 9 Drawing Sheets

(56) References Cited

OTHER PUBLICATIONS

3GPP, "Technical Specification Group Services and System Aspects; Telecommunication Management; Confirguration Management (CM) for mobile networks that include virtualized network functions; Procedures (Release 14)," Lte Advanced, 3GPP TS 28.511 V0.4.0 (Sep. 2016), 11 pages.
3GPP, "Technical Specification Group Services and System Aspects; Telecommunication Management; Confirguration Management (CM) for mobile networks that include virtualized network functions; Requirements (Release 14)," 3GPP TS 28.510 V1.0.0 (2061-09), Lte Advanced Pro, 18 pages.
3GPP, "Technical Specification Group Services and System Aspects; Telecommunication management; Study on network management of virtualized networks (Release 13)," 3GPP TR 32.842 V13.1.0 (Dec. 2015), Lte Advaned Pro, 84 pages.
ETSI, "Network Functions Virtualisation (NFV); Management and Orchestration; VNF Packaging Specification," ETSI GS NFV-IFA 011 V2.1.1 (Oct. 2016), 53 pages.
ETSI, "Network Functions Virtualisation (NFV); Management and Orchestration; Ve-Vnfm reference point—Interface and Information Model Specification," ETSI GS NFV-IFA 008 V2.1.1 (Oct. 2016), 83 pages.
3GPP, "Technical Specification Group Services and System Aspects; Telecommunication management; Configuration Management (CM); Basic CM Integration Reference Point (IRP); Information Service (IS) (Release 13)," 3GPP TS 32.602 V13.0.0 (Jan. 2016), Lte Advanced Pro, 27 pages.
3GPP, "Technical Specification Group Services and System Aspects; Telecommunication management; Evolved Packet Core (EPC) Network Resource Model (NRM) Integration Reference Point (IRP); Information Service (IS) (Release 14)," 3GPP TS 28.708 V14.0.0 (Mar. 2017), Lte Advanced Pro, 23 pages.
3GPP, "Technical Specification Group Services and System Aspects; Telecommunication management; Generic Network Resource Model (NRM) Integration Reference Point (IRP); Information Service (IS) (Release 14)," 3GPP TS 28.622 V14.1.0 (Jun. 2017), Lte Advanced Pro, 23 pages.
3GPP, "Technical Specification Group Services and System Aspects; Telecommunication Management; Configuration Management (CM) for mobile networks that include virtualized network functions; Procedures (Release 14)," 3GPP TS 28.511 V14.0.0 (Jun. 2017), Lte Advanced Pro, 12 pages.
SA5, "Presentation of Specification to TSG: TS 28.510 Configuration Management (CM) for mobile networks that include virtualized network functions; Requirements, Version 1.0.0," 3GPP TSG-SA Meeting #73, Tdoc SP-160616, Sep. 21-23, 2016, New Orleans, US, 2 pages.
3GPP, "Technical Specification Group Services and System Aspects; Telecommunication Management; Configuration Management (CM) for mobile networks that include virtualized network functions; Requirements (Release 14)," 3GPP TS 28.510 V1.0.0 (Sep. 2016), LTE Advanced Pro, 17 pages.

* cited by examiner

LIFECYCLE MANAGEMENT PARAMETER MODELING FOR VIRTUAL NETWORK FUNCTIONS

RELATED APPLICATION

This application is a national phase entry under 35 U.S.C. § 371 of International Application No. PCT/US2017/054502, filed Sep. 29, 2017, entitled "LIFECYCLE MANAGEMENT PARAMETER MODELING FOR VIRTUAL NETWORK FUNCTIONS," which claims priority to U.S. Provisional Application No. 62/416,624, filed Nov. 2, 2016, the entire disclosures of which are hereby incorporated by reference.

FIELD

Embodiments of the present disclosure generally relate to the field of networks, and more particularly, to apparatuses, systems, and methods for lifecycle management parameter modeling for virtual network functions.

BACKGROUND

Network orchestration is the management of physical and virtual devices to meet deployment and operational requirements of a network. The European Telecommunications Standards Institute, ETSI, network function virtualization, NFV, management and orchestration, MANO, describes a framework for providing virtualized network functions and related operations such as configuring the virtualized network functions and the corresponding infrastructure.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Various embodiments describe lifecycle management ("LCM") parameter modeling for virtual network functions ("VNFs"). In some embodiments, LCM-related parameters may be conveyed through a MO creation process that triggers instantiation of a VNF.

Figure 1:
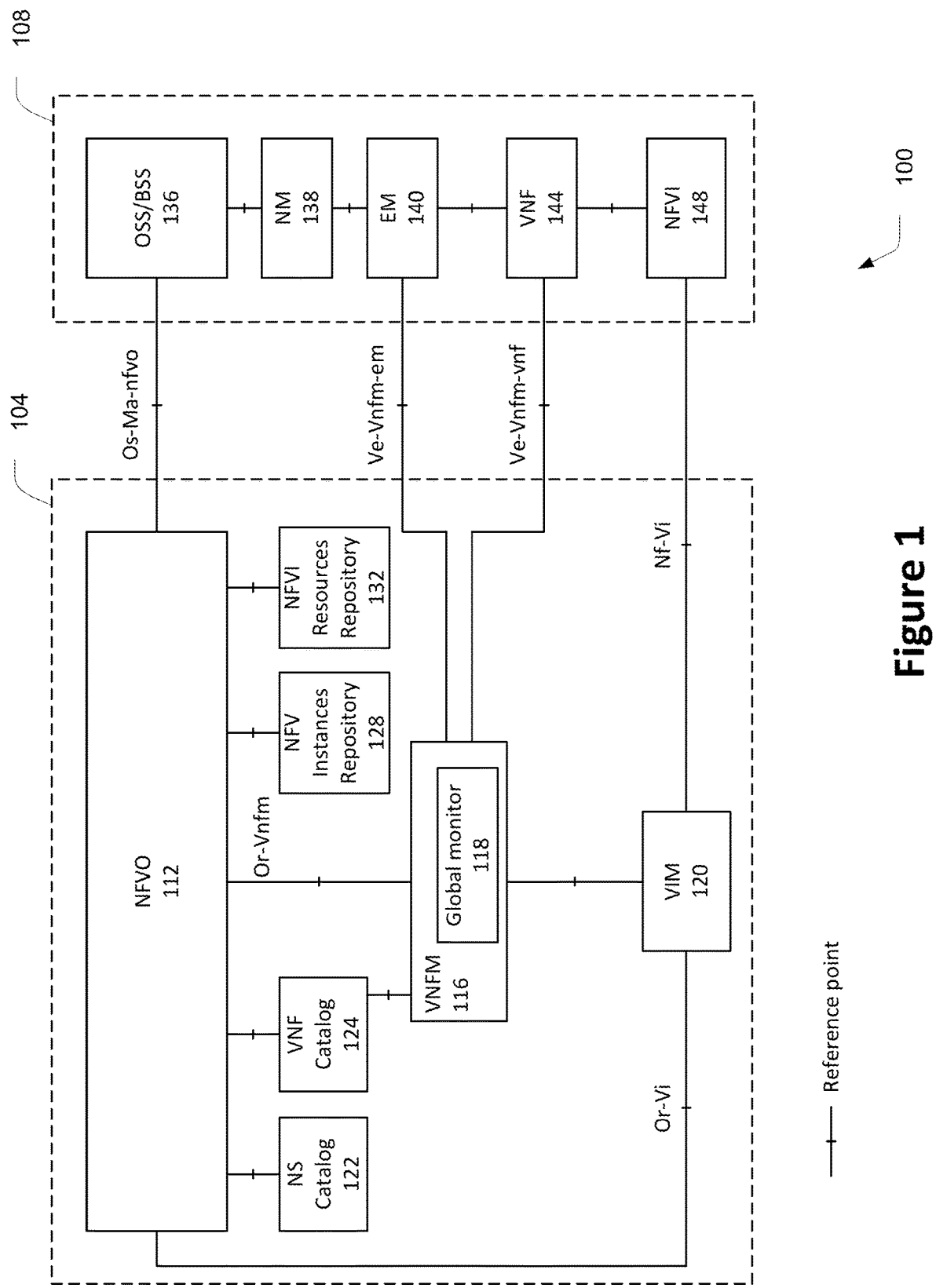
FIG. 1 illustrates a network function virtualization architecture in accordance with some embodiments.

FIG. 1 illustrates an NFV architecture 100 and reference points in accordance with some embodiments. The NFV architecture 100 may be employed in a network that operates in compliance with 3rd Generation Partnership Project, 3GPP, specifications.

The NFV architecture 100 may include an NFV-MANO system 104 coupled with core-network ("CN") service system 108 as shown. Each module shown in the NFV architecture 100 may represent a module designed to provide discrete operations, including, for example, management, orchestration, and communication operations, that are to facilitate provision of network services by the CN service system 108. Network service may be achieved through any combination of VNFs and physical network functions ("PNFs") which may be chained together.

The network service may be any type of service provided by network functions including core-network functions of a cellular network such as, but not limited to, a mobility management entity ("MME"), a packet data network gateway ("PGW"), a serving gateway ("SGW"), a policy charging and rules function ("PCRF"), a home location register ("HLR"), a visitor location register ("VLR"), a home subscriber server ("HSS"), a serving general packet radio service support node ("SGSN"), a gateway general packet radio service support node ("GGSN"), etc.

The modules of the NFV architecture 100 will be briefly described. However, unless otherwise described, operation of the modules of the NFV architecture 100 may be consistent with descriptions in European Telecommunications Standards Institute, ETSI, Group Specification, GS, NFV-Management and Orchestration, MAN, 001 V1.1.1 (2014-12).

In general, various computer systems may be adapted to provide the operations described with respect to the modules of the architecture 100. Some specifically adapted computer systems are described herein with respect to modules implementing operations of various embodiments. However, operations described with respect to other modules may be performed by similar computer systems adapted based on the objectives and implementation details associated with the particular modules.

The modules of the NFV architecture 100 are shown coupled with one another by various reference points. In some embodiments, specific implementations of the NFV architecture 100 may result in some of the modules being combined with others. In such cases, the reference point coupling the combined modules may be internalized.

In general, the NFV-MANO system 104 may provide management and orchestration operations to facilitate provision of virtualized network functions by the CN service system 108. The NFV-MANO system 104 may include a network function virtualization orchestrator ("NFVO") 112 coupled with a virtual network function manager ("VNFM") 116. The NFVO 112 may be further coupled with a number of data repositories such as, but not limited to, a network service ("NS") catalog 122, a virtual network function ("VNF") catalog 124, a network function virtualization ("NFV") instances repository 128, and an NFV infrastructure ("NFVI") resources repository 132.

The NFVO 112 may provide network service orchestration by coordinating the lifecycle of VNFs that jointly realize a network service. This may include managing the associations between different VNFs and the topology of a network service ("NS") and VNF forwarding graph descriptors ("VNFFGs") associated with the network service. It may be desirable for the NFVO 112 to be aware of all the resources available for reservation allocation at NFVI for an NS instance.

The NFVO 112 may be coupled with a VNF manager ("VNFM") 116 by an Or-Vnfm reference point. The VNFM 116 may be responsible for managing lifecycles of VNF instances. In various embodiments, the VNFM 116 may provide traditional management operations such as, but not limited to, fault management, configuration management, accounting management, performance management, and security management. The VNFM 116 may also provide scaling operations to change a configuration of virtualized resources. The scaling operations may include, but are not limited to, scaling up (for example, adding a central processing unit, CPU), scaling down (for example, removing a CPU or releasing some virtualized resources), scaling out (for example, adding a new virtual machine, VM), and scaling in (for example, shutting down and removing a VM instance).

In some embodiments, the VNFM 116 may include a global monitor 118. The global monitor 118 may be a background process that collects measurements related to performance metrics of VRs on which the VNFs, for example, VNF 144, are running.

The NS catalog 122 may represent a repository of all on-boarded network services to support creation and management of NS deployment templates. The NS deployment templates may include, but are not limited to, network service descriptor ("NSD"), virtual link descriptor ("VLD"), a VNF descriptor ("VNFD"), and a VNF forwarding graph descriptor, VNFFGD.

The VNF catalog 124 may represent a repository of all on-boarded VNF packages. As used herein, the VNF package may include, for example, a VNFD, software images, manifest files, etc. The information in the VNF catalog 124 may support creation and management of the VNF packages via interface operations exposed by the NFVO 112.

The VNF catalog 124 may be coupled with the NFVO 112 and the VNFM 116 via respective reference points. The NFVO 112 or the VNFM 116 may query the VNF catalog 124 to find and retrieve a VNFD to support operations such as, but not limited to, validation, checking instantiation feasibility, etc.

The NFV instances repository 128 may hold information of all VNF and NS instances.

Each VNF/NS instance may be represented by a VNF/NS record that is updated during the lifecycle of the respective instances to reflect changes resulting from execution of VNF/NS lifecycle management operations.

The NFVI resources repository 132 may hold information about available, reserved, and allocated NFVI resources as abstracted by a virtualized infrastructure manager, VIM, 120 coupled with the VNFM 116.

The VIM 120 may control and manage the NFVI resources, for example, compute, storage, and network resources used for NFV. In some embodiments, the VIM 120 may manage only a subset of one or more types of NFVI resources (for example, compute-only, storage-only, or networking-only). In other embodiments, the VIM 120 may manage a plurality of types of NFVI resources.

In addition to being coupled with the VNFM 116, the VIM 120 may also be coupled with the NFVO 112 by an Or-Vi reference point.

The CN system 108 may include an operations support system/business support system (OSS/BSS) 136, which may be composed of one or more devices to manage and orchestrate legacy systems by providing functions such as, but not limited to, network inventory, service provisioning, network configuration, and fault management. The OSS/BSS 136 may have full end-to-end visibility of services provided by legacy network systems.

The OSS/BSS 136 may be coupled with the NFVO 112 by an Os-Ma-nfvo reference point. The OSS/BSS 136 may be coupled with a network manager ("NM") 138 that is coupled with one or more element managers ("EMs") including, for example, EM 140. The NM 138 may primarily deal with network configuration (for example, configuring network routing tables), testing, and traffic analysis. The NM 138 may provide a package of end-user functions with the responsibility for the management of the network supported, for example, by the EM 140.

The EM 140 may be responsible for fault, configuration, performance, and security ("FCAPS") management functionality for a VNF, for example, VNF 144. In particular, the EM 140 may provide a number of management operations with respect to the network functions provided by the VNF 144. These management operations may include, but are not limited to, configuration, fault management, accounting, collection of performance measurement results, and security management. In some embodiments, the EM 140 may be coupled with the VNFM 116 over a Ve-Vnfm-em reference point in order to collaborate with the VNFM 116 to perform functions that rely on exchanges of information regarding the NFVI resources associated with the VNF 144.

The VNF 144 may be a software implementation of a network function that is capable of running on NFVI 148. The deployment and operational behavior of the VNF 144 may be described in a corresponding VNFD that may be stored in the VNF catalog 124.

The VNF 144 may be coupled with the VNFM 116 by a Ve-Vnfm-vnf reference point. The Ve-Vnfm-vnf reference point may support the exchange of messages that provide VNF instantiation, queries, updates, scaling, verification, configuration, etc.

The NFVI 148 may represent the hardware (for example, compute, storage, and networking circuitry) and software (for example, hypervisors) components that collectively provide the infrastructure resources where the VNF 144 is deployed. In some embodiments, the NFVI 148 may also include partially virtualized NFs that have part of their functionality virtualized and other parts embodied in a physical network function (PNF) (for example, built in silicon) due to, for example, physical constraints or vendor design choices.

Figure 2:
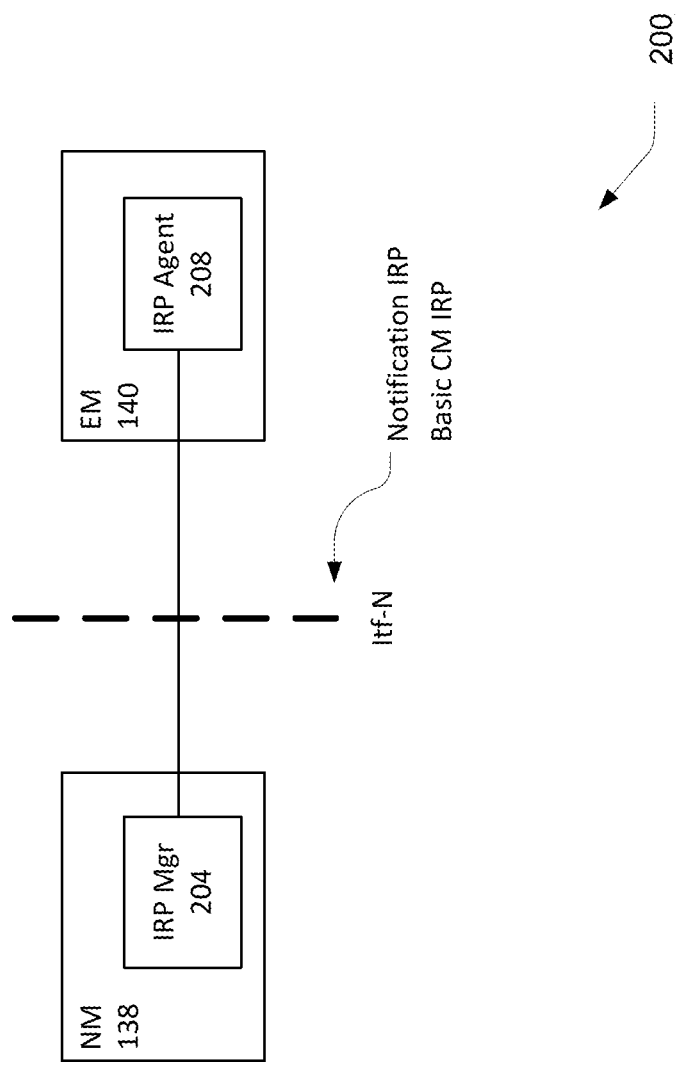
FIG. 2 illustrates a network manager and element manager in accordance with some embodiments.

The NFVI 148 may be coupled with the VIM 120 by an Nf-Vi reference point. The Nf-Vi reference point may support the exchange of VM management messages to provide/update VM resources allocation, migrate/terminate VMs, manage connections between VMs, etc. FIG. 2 illustrates the NM 138 and EM 140 in more detail in accordance with some in accordance with embodiments. The NM 138 may include an integration reference point ("IRP") manager 204 that may be coupled with IRP agent 208 in the element agent 140.

Figure 3A:
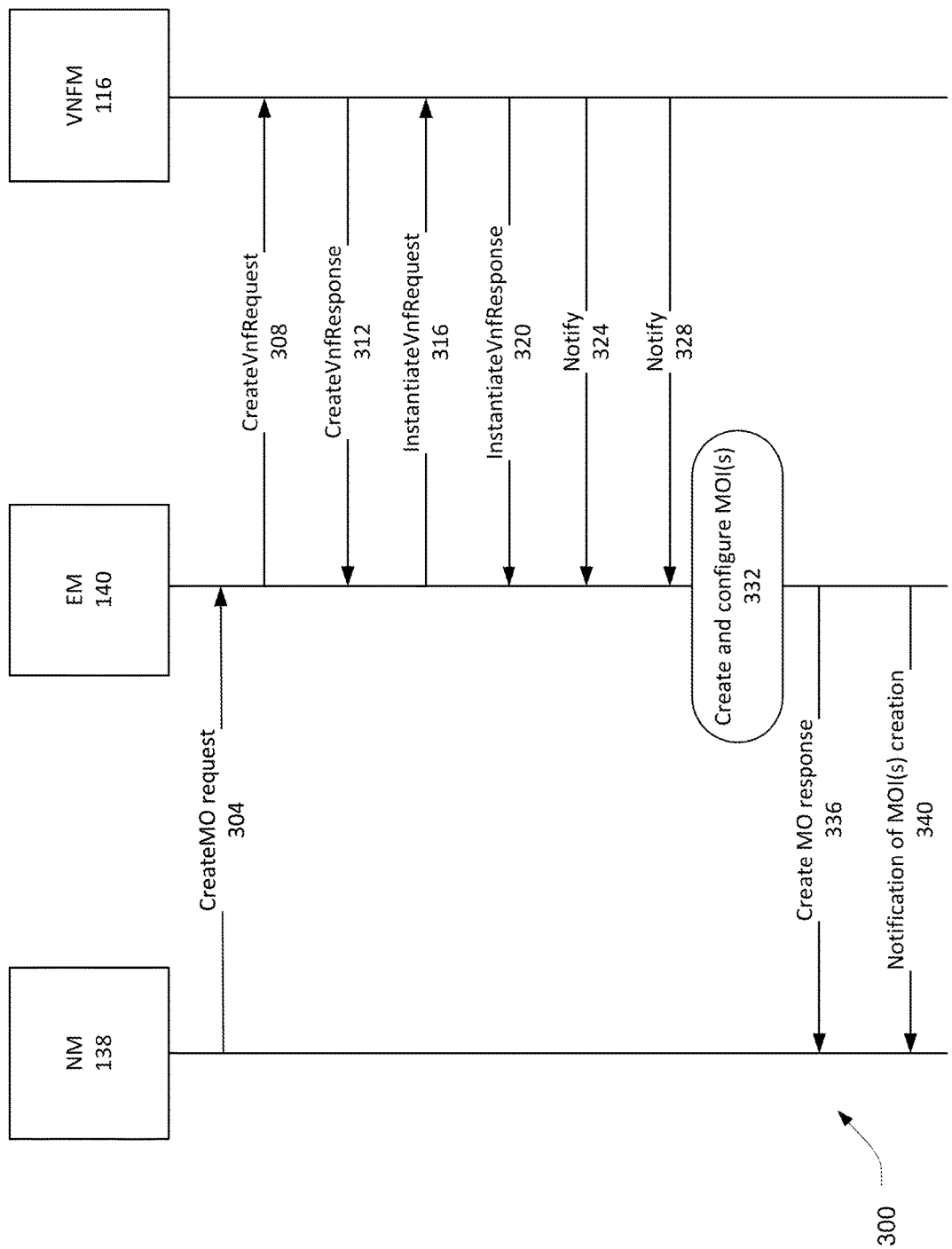
FIGS. 3a and 3b illustrate a message exchanges in accordance with some embodiments.

The IRP manager 204 and the IRP agent 208 may transmit configuration management information over interface ("Itf-N"). An IRP may describe a set of specifications for defining aspects of the management interface including, for example, the requirement specification, and information service specification, and one or more solution set specifications. Depending on the messages communicated, the Itf-N may represent a notification IRP, a basic configuration management ("CM") IRP, a bulk CM IRP, etc. FIG. 3a illustrates a message exchange 300 between the NM 138, the EM 140, and the VNFM 116 in accordance with some embodiments.

The message exchange 300 may be a create managed object ("MO") operation consistent with definitions of a basic CM IRP in 3GPP Technical Specification ("TS") 32.602, V13.0.0 (2016-01) except as otherwise noted. The create-MO (also referred to as "CreateMO") operations may be invoked by the IRP manager 204 to request the IRP agent 208 to create an MO instance ("MOI") in a management information base ("MIB") maintained by the IRP agent 208. The create MO operation may create one MO instance at a time.

While FIG. 3 shows NM 138 and EM 140 exchanging messages, it will be understood that the NM 138 and EM 140 may have logic to implement IRP manager 204 and IRP agent 208, respectively, to perform some or all of the create-MO operations attributed to the NM 138 and the EM 140.

Embodiments describe use and signaling of LCM-related parameters within the create MO operation. The LCM related parameters may include, but are not limited to, a VNF descriptor ("VNFD") ID and a flavour ID.

The VNFD ID may be an identifier of the VNFD on which the VNF instance is based. The VNFD may include a plurality of attributes to define deployment or operational behaviour requirements of the VNF. The VNFD may be described consistent with definitions of ETSI GS NFV-IFA 011 v2.1.1 (2016-10). The attributes of a VNFD may include information related to: VNF provider; VNF product; VNF software version; VNFD version; VNF product information name; VNF product information description; VNFM(s) compatible with VNF described by VNFD; localization language(s) of the VNF; default localization language; virtualization deployment unit; virtual compute/storage/link resources to be used by VNF; external interfaces exposed by VNF; deployment flavour of a VNF with specific requirements for capacity and performance; configurable properties of the VNF; modifiable attributes of the VNF; events and corresponding management scripts performed for the VNF; associated elements of a VNFD for a certain purpose during VNF LCM; VNF indicators that are supported by this VNF; autoscaling rule; etc. The flavour ID may be an identifier of a deployment flavour ("DF") of the VNF instance. The DF may include a plurality of attributes that define a specific deployment version of the VNF. The DF may be described consistent with definitions of ETSI GS NFV-IFA 011 v2.1.1 (2016-10). The attributes of a DF may include information related to: description of the DF; additional instantiation data for the VDUs used in this flavour; internal virtual link descriptor along with additional data which is used in this DF; various levels of resources that can be used to instantiate the VNF using this flavour (for example, small, medium, large); default instantiation level for this DF if multiple instantiation levels are present; operations are available for this DF via the VNF LCM interface; configuration parameters for the VNF LCM operations; affinity or anti-affinity relationship applicable between the virtualisation containers (e.g. virtual machines) to be created using different VDUs or internal VLs to be created using different VnfVirtualLink-Desc(s) in the same affinity or anti-affinity group; virtualised resources monitoring parameters on VNF level; scaling aspect supported by this DF of the VNF; etc.

The message exchange 300 may describe how the NM 138 sends one or more create-MO requests to ask the EM 142 instantiate a VNF. It may be assumed that the NM 138 has on boarded the VNF package and the EM 140 has subscribed to receive VNF lifecycle change notifications from the VNFM 116.

The message exchange 300 may include, at 304, the NM 138 sending the create-MO request to initiate the create-MO operation. The create-MO request may be transmitted over the Itf-N and may request the EM 142 to instantiate a VNF. The create-MO request may provide information needed for a VNF instantiation. The information may be included directly in the create-MO request or may be referenced by one or more attributes in the create-MO request due to inherency, for example, as will be described in further detail below. In some embodiments, information needed for a VNF instantiation may include, but is not limited to: a VNFD ID, which may be obtained from the VNF package stored in the VNF catalog 124, for example; a VNF instance name; and a VNF instance description.

The VNF instance name and description may be human-readable name and description of the VNF instance to be created.

The IRP manager 204 of the NM 138 may supply the IRP agent 208 of the EM 140 with the values of all attributes that are supported including, for example, an attribute list that includes a list of name/value pairs that specify attribute identifiers and their values to be assigned to the new managed object.

The message exchange 300 may further include, at 308, the EM 140 sending a create-VNF request to the VNFM 116 to request creation of a VNF identifier by the VNFM 116. The create-VNF request may include or otherwise provide parameters indicated in the create-MO request including, but not limited to, the VNFD ID, the VNF instance name, and the VNF instance description.

The message exchange 300 may further include, at 312, the VNFM 116 sending a create-VNF response to the EM 140. The create-VNF response may include a VNF instance ID to indicate the creation of a new VNF instance identifier.

The message exchange 300 may further include, at 316, the EM 140 sending an instantiate-VNF request to the VNFM 116 to request that the VNFM instantiate a VNF. The instantiate-VNF request may include input parameters, such as, but not limited to: a VNF instance ID (an identifier of the VNF instance); flavour ID; instantiation level ID (identifier of the instantiation level of the DF to be instantiated); external virtual link (information about external virtual link(s) ("VLs") to connect with the VNF); external managed virtual link (information about internal VLs that are managed by entities other than the VNFM 116); localization language (localization language of the VNF to be instantiated); and any additional parameters passed by the EM 140 as input to the instantiation process and specific to the VNF being instantiated.

The message exchange 300 may further include, at 320, the VNFM 116 sending an instantiate-VNF response to the EM 140. The instantiate-VNF response may include an identifier of the VNF lifecycle operation occurrence.

The message exchange 300 may further include, at 324, the VNFM 116 sending a notify message to the EM 140 to indicate a start of the VNF instantiation. The notify message may be a one-way operation to distribute notifications to subscribers (for example, EMNNF that has a subscription). The notify message may carry a VNF lifecycle change notification information element (IE) with attributes including, for example, VNF instance ID, status="start," operation="instantiation," lifecycle operation occurrence ID (identifier of the VNF lifecycle operation occurrence associated to the notification), affected VNFC (information about VNFC instances that were affected during the lifecycle operation), affected VL (information about VL instances that were affected during the lifecycle operation), and affected virtual storage (information about virtualized storage instances that were affected during the lifecycle operation).

The message exchange 300 may further include, at 328, the VNFM 116 sending a notify message to the EM 140 to indicate a result of the VNF instantiation. The notify message at 328 may be sent when the VNF instantiation operation is complete. The notify message may carry a VNF lifecycle change notification information element (IE) with attributes including, for example, VNF instance ID, status="result," operation="instantiation," lifecycle operation occurrence ID, affected VNFC, affected VL, and affected virtual storage.

The message exchange 300 may include, at 332, the EM 140 creating and configuring MOI(s) to represent the VNF instance, per the corresponding create-MO request if any received from NM 138. For example, if the VNF instance is an MME VNF, it may create an MOI of MMEFunction IOC, according to the create-MO request received from NM 138, and configure an attribute vnjInstanceId that is inherited from managed function IOC by the MMEFunction IOC.

In some embodiments, a new attribute may be added to the managed Junction IOC to store a vnjInstanceId that was received from the VNFM 116.

The message exchange 300 may further include, at 336, the EM 140 sending a create-MO response to the NM 138. The create-MO response may indicate an acceptance of the request to create an MO and may include a number of output parameters including, for example, the vnjInstanceId.

The message exchange 300 may further include, at 336, the EM 140 sending a notification of MOI(s) creation to the NM 138.

Figure 3B:
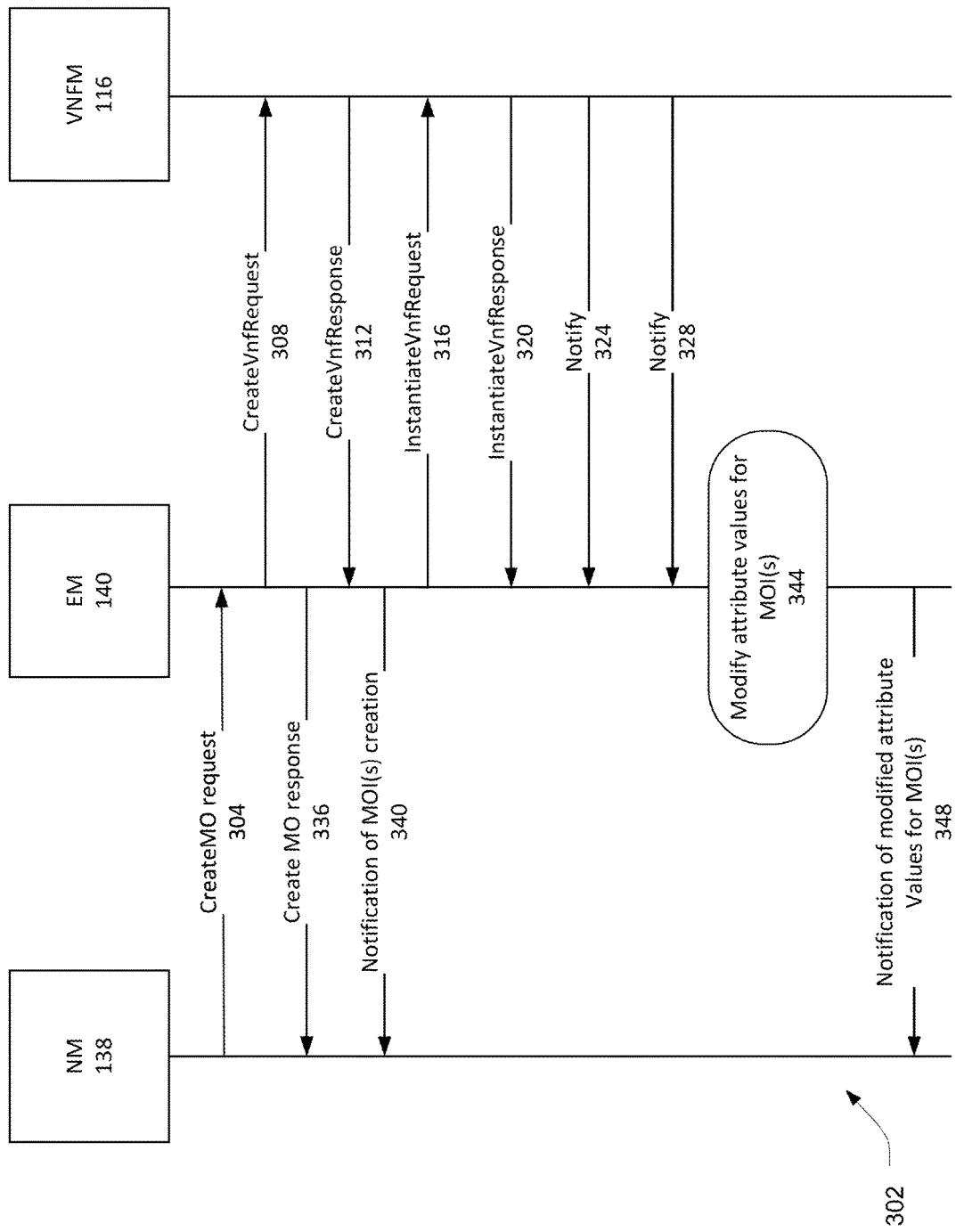

FIG. 3*b* illustrates a message exchange 302 in accordance with some embodiments. the message exchange 302 may be similar to message exchange 300 except the create-MO response 336 is transmitted before VNF instantiation. Therefore, vnjInstanceID and possibly other parameters obtained from VNFM 116 in messages 312, 320, 324, or 328, are not available. Thus, after VNF instantiation, the EM 140 may modify attribute values for the MOI, at 344, and send a notification of the modified attribute values for MOI(s) at 348.

To trigger a VNF instantiation from CreateMO, information related to VNF instantiation (for example, VNFD ID, flavour ID, etc.) may be conveyed by the CreateMO operation.

Three options for conveying such information include: I—enhance both network resource model ("NRM") and interface IRPs; II—enhance only NRM IRP; and III—enhance only the interface IRP.

Option I—Enhance Both the NRM and Interface IRPs

Modeling LCM-Related Parameters

The enhancement to the NRM IRP may be done by modeling LCM-related parameters (for example, VNFD ID, flavour ID, etc.) to a dedicated IOC (for example, VirtualisationInfo IOC) that is separate from the interface IRP.

TABLE 1

| Attribute Name | Support Qualifier | isReadable | isWritable | isInvariant | isNotifyable |
|---|---|---|---|---|---|
| id | M | M | — | M | — |
| vNFDId | CM | M | — | — | — |
| flavourId | CM | M | CM | — | M |

The newly-defined IOC (for example, VirtualisationInfo IOC, as used below) may include the parameters of Table 1.

Figure 4:
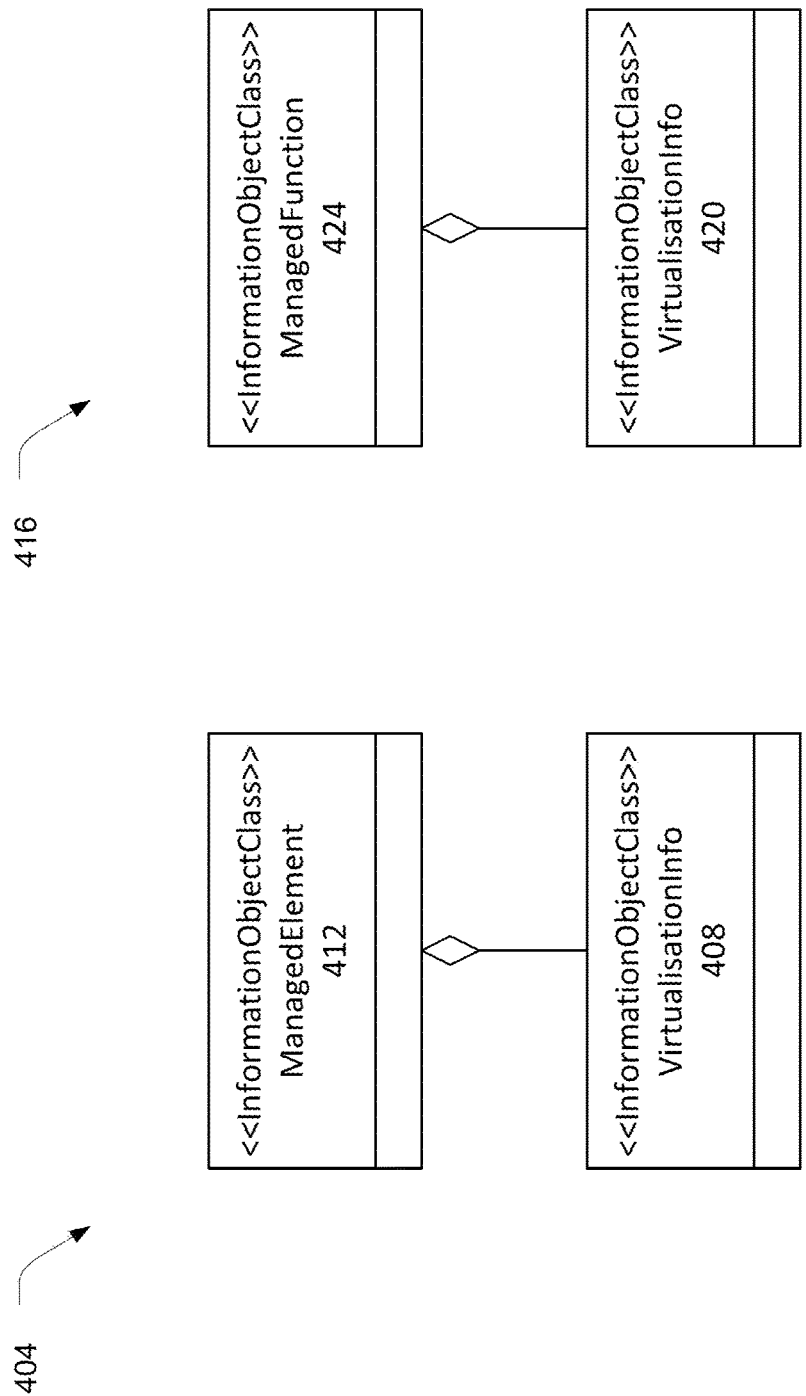
FIG. 4 illustrates containment relationships in accordance with some embodiments.

The instance of this IOC may be contained either by a managed element MOI representing a virtualized NE, or by an MOI representing the network function (for example, MMEFunction). In class diagrams, these relationships may be shown by FIG. 4. FIG. 4 illustrates containment relationships in accordance with some embodiments. In particular, FIG. 4 illustrates containment relationship 404 between VirtualisationInfo IOC 408 and managed element IOC 412 and containment relationship 416 between VirtualisationInfo IOC 420 and managed function IOC 424. The containment relationship 404 may represent a case in which the instance of the dedicated IOC is contained by an MOI of a managed element, while containment relationship 424 may represent a case in which the instance of the dedicated IOC is contained by an MOI of a managed function (for example, MMEFunction).

VNF Instantiation Via Create MO Operation

Some embodiments may create an MO of a managed element or an MO of a managed function (for example, MMEFunction) one by one, and then trigger the VNF instantiation by creating the MO of the VirtualisationInfo. In this embodiment, the create MO operation of message exchange 300 or 302 may be performed for each MOI. For example, the message exchange 300 or 302 may be adapted to include a one or more procedures of the create-MO request, create-MO response, and optionally notification of MOI(s) creations between the NM 138 and EM 140 before the create-MO request is sent at 304 to trigger VNF instantiation. The EM 140 may then use all the information received from initial create-MO requests to instantiate the VNF, although only the last create-MO request (at 304) would trigger the action of the VNF instantiation.

This would require no changes to the CreateMO operation of a basic CM IRP. This may ensure backward and forward compatibility of reusing the basic CM IRP for NFV management. However, this may also result in the VNF instantiation becoming disconnected from other MO creations.

In some embodiments, VNF instantiation may be performed by creating an MO of a managed element or an MO representing a network function (for example, MMEFunction) and an MO of VirtualizationInfo at the same time. For example, one iteration of the create-MO operation of message exchange 300 or 302 may be used to create a plurality of MOIs. This embodiment may include changes to the basic CM IRP to allow creating a plurality of MOIs in one MO creation operation. This could be done by enhancing an existing CreateMO operation, or defining a new operation, for example, CreateMO4NFV, which may be conditionally mandatory ("CM") or conditionally optional ("CO").

In some embodiments, elements of a CreateMO operation, such as those described in 3GPP TS 32.602, may be changed as follows in order to allow for the CreateMO operation to be used to create a plurality of MOIs.

As previously discussed with respect to FIG. 3, a create-MO operation may be invoked by the IRPManager 204 to request the IRPAgent 208 to create an MOI in the MIB maintained by the IRPAgent 208. This operation may create one or more MOIs. This operation may provide functionality that is similar to that provided by an M-CREATE service defined by common management information service ("CMIS").

The IRPManager 204 may supply the values of all attributes that are supported, for example, attributes whose support qualifier is mandatory ("M") and attributes whose support qualifier is optional ("O") and supported by an agreement between IRPManager 204 and IRPAgent 208, except in the following cases.

The first exception may be if the attribute has a default value specified. In this case, if the IRPManager 204 supplies a value, the supplied value may be used, else the default value may be used.

The second exception may be if the attribute is specified as capable of carrying a null value or carrying no information. In this case, if the IRPManager 204 supplies a (non-null) value, the supplied value may be used; otherwise, the null value may be used. The third exception may be if the attribute does not have a default value specified and is specified as incapable of carrying null value or incapable of carrying no information. In this case, if there is a vendor-defined default value, then that value may be used. Input parameters used in these embodiments may include the parameters that the IRP manager 204 provides to the IRP agent 208 in the create-MO message at 304. The input parameters are shown in Table 2 in accordance with some embodiments.

TABLE 2

| Name | Qualifier | Information Type | Comment |
|---|---|---|---|
| managedObjectClass | M | class | This parameter specifies the class of the new managed object instance. |
| managedObjectInstance | M | DN | This parameter specifies the instance(s) of the managed object(s) that are to be created and registered. This is a list of full distinguished names ("DNs") according to 3GPP TS 32.300, v13.1.0, 2016 Mar. 17. |
| referenceObjectInstance | O | Solution set ("SS") dependant | This parameter may have a null value. When this parameter is supplied, it must specify an existing instance of a managed object, called the reference object, of the same class as the new object to be created. Attribute values associated with the reference object instance become the default values for those not specified by the attributeListIn parameter. |
| attributeListIn | M | LIST OF SEQUENCE< attribute name, attribute value> | This parameter may have a null value. When this parameter is supplied, it contains a list of name/value pairs specifying attribute identifiers and their values to be assigned to each new managed object. These values override the values for the corresponding attributes derived from either the reference object (if the referenceObjectInstance parameter is supplied) or the default value set specified in the definition of the managed object's class. |

Output parameters used in these embodiments may include the parameters that the IRP manager 204 receives from the IRP agent 208 in the create MO response. The output parameters are shown in Table 3 in accordance with some embodiments.

TABLE 3

| Name | Qualifier | Matching Information | Comment |
|---|---|---|---|
| attributeListOut | M | LIST OF SEQUENCE< attribute name, attribute value> | This list of name/value pairs contains the attributes of each new managed object and the actual value assigned to each. |
| status | M | ENUM (OperationSucceeded, OperationFailed) | An operation may fail because of a specified or unspecified reason. |

In some embodiments, pre- or post-conditions may be defined for use in a CreateMO operation. In some embodiments, a pre-condition may be that a managed entity does not exist. For example, an assertion name managedEntityDoesNotExist may set to be true if a ManagedEntity instance with the same distinguished name ("DM") as the object specified for creation does not exist. This pre-condition may ensure that duplicative ManagedEntity instances are not created.

In some embodiments, a post-condition may be defined to require both that a managed entity is created (for example, managedEntityCreated is true) and an object creation notification is emitted (for example, objectCreationNotiftcationEmitted is true). The managedEntityCreated assertion name may be set to true iftheManagedEntity instances have been created with the supplied DN(s). The objectCreationNotifzcationEmitted assertion name may be set to true if an object creation notification (as defined in 3GPP TS 32.662 v13.0.0, Jan. 14, 2016) is emitted for each instance, if notifiable, e.g., if the notification is supported and not suppressed.

In some embodiments, various exceptions may be defined, which may be communicated through the status output parameter. Table 4 shows exceptions that may be used in accordance with some embodiments.

TABLE 4

| Name | Definition |
| --- | --- |
| operationFailed | Condition: Pre-condition is false or post-condition is false. |
| | Returned Information: The output parameter status. |
| | Exit state: Entry state. |
| objectClassSpecificationMissmatched | Condition: The object class named by ObjectClassIdentifier input parameter does not match the object class of the managed object specified by a non-null referenceObjectInstance input parameter. |
| | Returned Information: The output parameter status. |
| | Exit state: Entry state. |
| InvalidObjectInstance | Condition: The object instance name specified implied a violation of the naming rules; |
| | Returned Information: The output parameter status. |
| | Exit state: Entry state. |
| createNotAllowed | Condition: The object to be created may not be created over the Itf-N. |
| | Returned Information: The output parameter status. |
| | Exit state: Entry state. |
| noSuchObjectClass | Condition: The class of the specified managed object is not recognized. |
| | Returned Information: The output parameter status. |
| | Exit state: Entry state. |
| classInstanceConflict | Condition: The specified managed object instance may not be created as member of the specified class. |
| | Returned Information: The output parameter status. |
| | Exit state: Entry state. |
| noSuchAttribute | Condition: A specified attribute is not recognized or is not valid for specified object class. |
| | Returned Information: The output parameter status. |
| | Exit state: Entry state. |
| invalidAttributeValue | Condition: Value specified for an attribute is not valid for that attribute. |
| | Returned Information: The output parameter status. |
| | Exit state: Entry state. |
| missingAttributeValue | Condition: One or more required attribute values were not supplied and default values are not available. |
| | Returned Information: The output parameter status. |
| | Exit state: Entry state. |
| parentObjectDoesNotExist | Condition: The parent MO instance of the ManagedEntity specified to be created does not exist. |
| | Returned Information: The output parameter status. |
| | Exit state: Entry state. |

The changes shown above to the basic CM IRP can keep backward compatibility but may not be able to support forward compatibility.

Option II—Enhance Only NRM IRP

Modeling LCM-Related Parameters into Managed Element IOC

The LCM-related parameters (for example, VNFD ID, flavour ID, etc.) may be modeled into the managed element IOC and defined as conditional mandatory ("CM") parameters with the conditions: (1) the network function is virtualized, and (2) VNF instantiation for this NE can be triggered by CreateMO operation.

The managed element IOC with the additional attributes for VNF LCM is shown in Table 5.

TABLE 5

| Attribute Name | Support Qualifier | isReadable | isWritable | isInvariant | isNotifyable |
|---|---|---|---|---|---|
| id | M | M | — | M | — |
| vendorName | M | M | — | — | M |
| userDefinedState | M | M | M | — | M |
| swVersion | M | M | — | — | M |
| vNFDId | CM | M | — | — | — |
| flavourId | CM | M | CM | — | M |

Modeling LCM-Related Parameters into Managed Function IOC

As an alternative to modeling LCM parameters into a managed element IOC, the LCM parameters may be modeled into the managed function IOC and defined as conditional mandatory ("CM") parameters with the conditions: (1) the network function is virtualized, and (2) VNF instantiation for this NE can be triggered by CreateMO operation. The Managed Junction IOC with the additional attributes for VNF LCM is shown in Table 6.

TABLE 6

| Attribute Name | Support Qualifier | isReadable | isWritable | isInvariant | isNotifyable |
|---|---|---|---|---|---|
| id | M | M | — | M | — |
| vNFDId | CM | M | — | — | — |
| flavourId | CM | M | CM | — | M |

VNF Instantiation Via CreateMO Operation

In this option, changes to the basic CM IRP may not be needed because the VNF instantiation can be triggered by the existing CreateMO operation when creating an MO of the managed element or the MO representing the network function (for example, MMEFunction) where the LCM-related parameters are provided. Thus, both backward and forward compatibility of Basic CM IRP can be supported for this option.

Option III—Enhance Only Interface IRP

Modeling LCM-Related Parameters as Parameters of MO Creation Operation

This option may include changes to basic CM IRP to allow support information to be carried as a separate parameter in the create-MO operation. This may be done by enhancing an existing CreateMO operation, or defining a new operation (for example, CreateMO4NFV, which may be conditionally mandatory or conditionally optional). The existing CreateMO operation of 3GPP TS 32.602 may be changed as follows.

As previously discussed with respect to FIG. 3 (and Option I), a create MO operation may be invoked by the IRPManager 204 to request the IRPAgent 208 to create an MOI in the MIB maintained by the IRPAgent 208. In this operation, for this option, one create MO operation may be used to create one MOI. This operation may provide functionality that is similar to that provided by an M-CREATE service defined by CMIS.

The IRPManager 204 may supply the values of all attributes that are supported, for example, attributes whose Support Qualifier is M and attributes whose Support Qualifier is 0 and supported by an agreement between IRPManager 204 and IRPAgent 208, except in the following cases.

The first exception may be if the attribute has a default value specified. In this case, if the IRPManager 204 supplies a value, the supplied value may be used, else the default value may be used.

The second exception may be if the attribute is specified as capable of carrying a null value or carrying no information. In this case, if the IRPManager 204 supplies a (non-null) value, the supplied value may be used; otherwise, the null value may be used.

The third exception may be if the attribute does not have a default value specified and is specified as incapable of carrying null value or incapable of carrying no information. In this case, if there is a vendor-defined default value, then that value may be used. Input parameters used in these embodiments may be shown in Table 7 in accordance with some embodiments.

TABLE 7

| Name | Qualifier | Information Type | Comment |
|---|---|---|---|
| managedObjectClass | M | class | This parameter specifies the class of the new managed object instance. |
| managedObjectInstance | M | DN | This parameter specifies the instance of the managed object that is to be created and registered. This is a full DN according to 3GPP TS 32.300. |
| referenceObjectInstance | O | SS dependant | This parameter may have a null value. When this parameter is supplied, it must specify an existing instance of a managed |

TABLE 7-continued

| Name | Qualifier | Information Type | Comment |
|---|---|---|---|
| attributeListIn | M | LIST OF SEQUENCE< attribute name, attribute value> | object, called the reference object, of the same class as the new object to be created. Attribute values associated with the reference object instance become the default values for those not specified by the attributeListIn parameter. This parameter may have a null value. When this parameter is supplied, it contains a list of name/value pairs specifying attribute identifiers and their values to be assigned to the new managed object. These values override the values for the corresponding attributes derived from either the reference object (if the referenceObjectInstance parameter is supplied) or the default value set specified in the definition of the managed object's class. |
| supportingInfo | CM | LIST OF SEQUENCE< attribute name, attribute value> | This parameter provides the supporting information for IRPAgent to create the managed object instance. The example of the supporting information could be vNFDId flavourId of the VNF (virtualized NE) to be instantiated triggered by this operation. |

Output parameters used in these embodiments may be shown in Table 8 in accordance with some embodiments.

TABLE 8

| Name | Qualifier | Matching Information | Comment |
|---|---|---|---|
| attributeListOut | M | LIST OF SEQUENCE< attribute name, attribute value> | This list of name/value pairs contains the attributes of the new managed object and the actual value assigned to each. |
| supportingInfoOut | O | LIST OF SEQUENCE< attribute name, attribute value> | This parameter may have a null value, but it must be supplied if the actual value assigned is is different from the supportingInfo input parameter. This list of name/value pairs contains the attributes of the supportingInfo and the actual value assigned to each. |
| status | M | ENUM (OperationSucceeded, OperationFailed) | An operation may fail because of a specified or unspecified reason. |

VNF Instantiation Via Create MO Operation

In this option, the VNF instantiation may be triggered by the element manager 140 (for example, the IRP agent 208) when the supportingInfo parameter of the CreateMO (or CreateMO4NFV) operation includes a valid VNFD ID and flavour ID of the VNF (virtualized NE).

Figure 5:
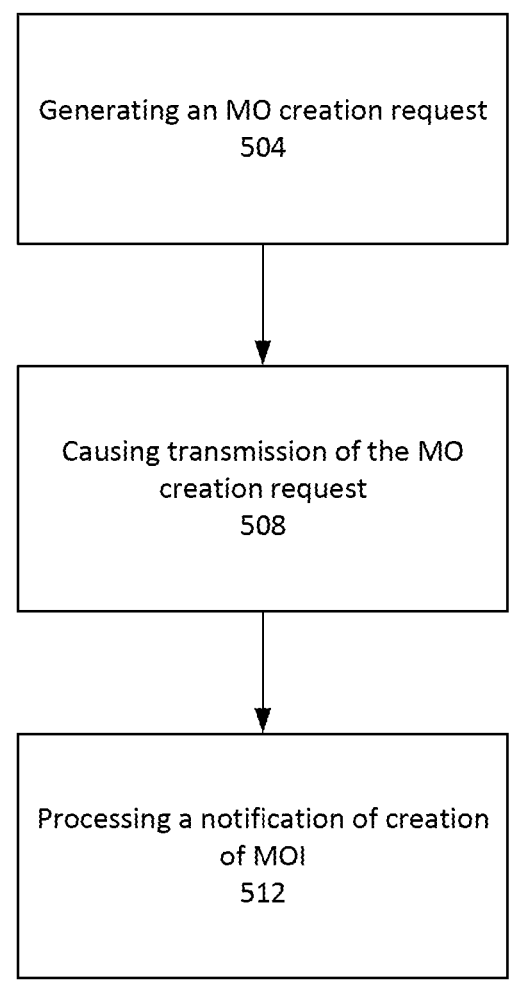
FIG. 5 illustrates an example operation flow/algorithmic structure of a network manager in accordance with some embodiments.

Aspects of the three options discussed above may be used, in any combination, to provide for LCM parameters modeling for VNF instantiation triggered by MO creation. FIG. 5 illustrates an example operation flow/algorithmic structure 500 of the NM 138 according to some embodiments. In particular, the NM 138 may have logic to implement an IRP manager, for example, IRP manager 204, to perform the operation flow/algorithmic structure 500.

The operation flow/algorithmic structure 500 may include, at 504, generating a create MO request. The create-MO request may be generated by the IRP manager 204 to request creation of an MOI for a managed object class. The create-MO request may include a parameter to indicate the requested MOI and managed object class and one or more other input parameters such as those given above in Tables 2 and 7.

The managed object class may be related to one or more other IOCs including, for example, a managed element IOC, a managed function IOC, or a dedicated IOC (for example, virtualization IOC). The relationship between the managed object class and the one or more other IOCs may be, for example, a sub-class association in which the managed object class is a sub-class of the other IOC. This may result in the managed object class inheriting attributes from the other IOC. For example, the managed function IOC may be a base class of the managed object class and, therefore, the managed object class may inherit attributes of the managed function IOC. The inherited attributes may indicate, for example, LCM-related parameters.

In some embodiments, the managed object class may correspond to a network function such as, but not limited to, an MME function, an SGW function, a PGW function, a PCRF function, an evolved packet data gateway ("EPDG") function, etc.

In some embodiments, the create MO request may function as a request to instantiate a VNF. In some embodiments, this may be done by setting a VNF instance ID to a null value in the create MO request.

The operation flow/algorithmic structure 500 may further include, at 508, causing transmission of the create MO request. The IRP manager 204 may cause the create MO request to be transmitted to the IRP agent 208 via the Itf-N, which may function as a basic CM IRP, for example.

The operation flow/algorithmic structure 500 may further include, at 512, processing a notification of creation of an MOI. The notification may be received from the IRP agent 208, via a notification IRP, and processed by the IRP manager 204. The notification may include an indication that the MOI requested at 504 (or another MOI) was created.

The notification of creation of an MOI may also indicate status of the VNF instantiation. If the VNF was successfully instantiated, the VNF may be used to provide its network function within the NFV architecture 100, for example.

Figure 6:
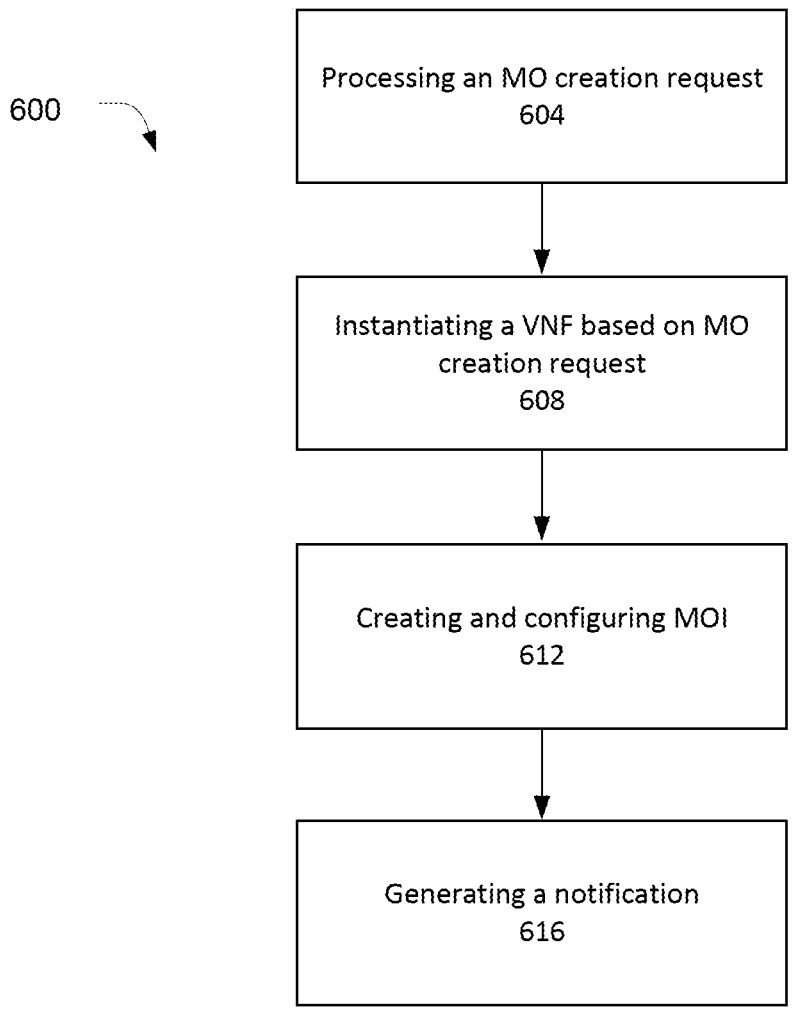
FIG. 6 illustrates an example operation flow/algorithmic structure of an element manager in accordance with some embodiments.

FIG. 6 illustrates an example operation flow/algorithmic structure 600 of the EM 140 according to some embodiments. In particular, the EM 140 may have logic to implement an IRP agent, for example, IRP agent 208, to perform the operation flow/algorithmic structure 600.

The operation flow/algorithmic structure 600 may include, at 604, processing a create MO request. The create MO request may be received from the IRP manager 204 via the Itf-N, which may function as a basic CM IRP, for example.

The IRP agent 208 may interpret the create-MO request as a request create an MOI for a managed object class. The create-MO request may include a parameter to indicate the requested MOI and managed object class and one or more other input parameters such as those given above in Tables 2 and 7.

The managed object class may be associated with one or more other IOCs and, therefore, may inherit attributes as described above.

The operation flow/algorithmic structure 600 may further include, at 608, instantiating a VNF based on the create MO request. The IRP agent 208 may interpret the create MO request as a request to instantiate a VNF due to, for example, a VNF instance ID of the create MO request being set to a null value. In this case, the IRP agent 208 may engage in a message exchange with the VNFM 116 to instantiate a VNF. The message exchange may be similar to message exchange 300a or message exchange 300b discussed above with respect to FIG. 3.

Upon a successful VNF instantiation, the operation flow/algorithmic structure 600 may further include, at 612, creating and configuring an MOI. The IRP agent 208 may create and configure an MOI with attributes discovered through the create MO operation or the VNF instantiation operation.

The operation flow/algorithmic structure 600 may further include, at 616, generating a notification of creation of an MOI. The IRP agent 208 may cause the notification to be transmitted, via a notification IRP, to the IRP manager 204. The notification may include an indication that the MOI requested in the create MO request (or another MOD was created and may also indicate a status of the VNF instantiation.

Figure 7:
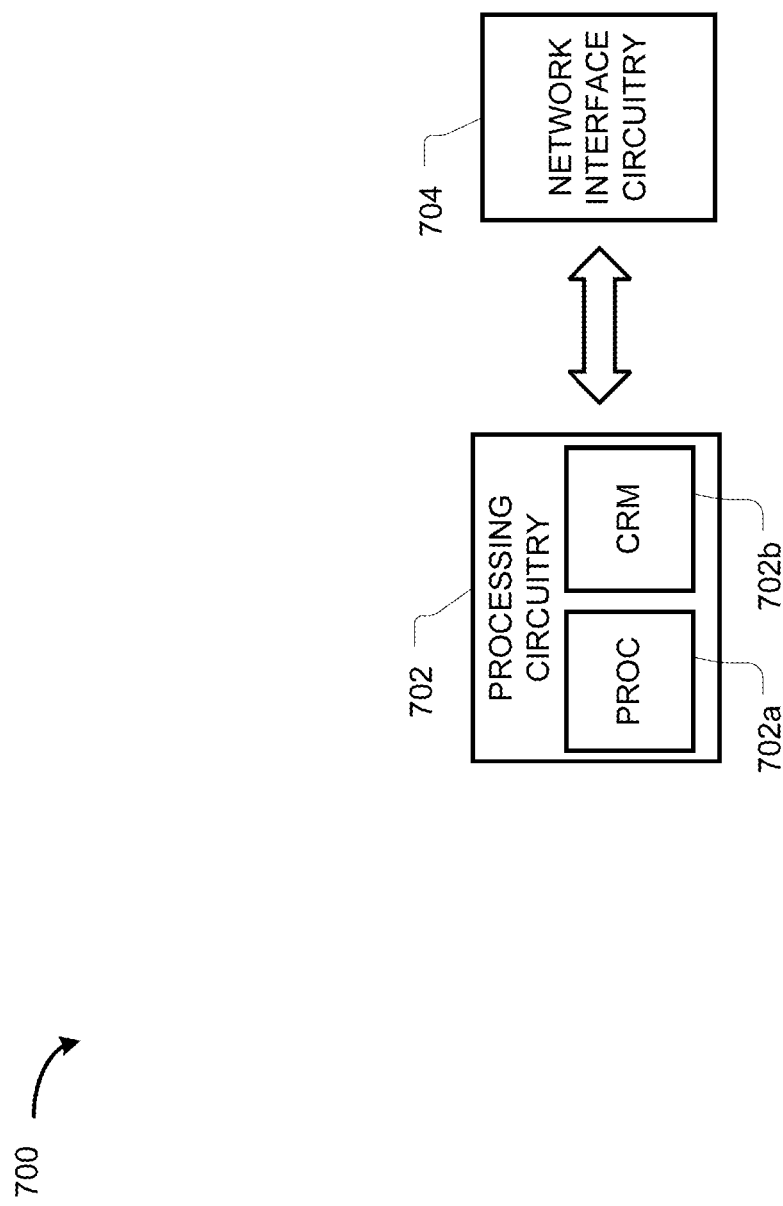
FIG. 7 illustrates an electronic device in accordance with some embodiments.

Embodiments described herein may be implemented into a system using any suitably configured hardware or software. FIG. 7 illustrates, for one embodiment, example components of an electronic device 700. In embodiments, the electronic device 700 may be, implement, be incorporated into, or otherwise be a part of NM 138, EM 140, VNFM 116, NFVI 148, or some other device.

In some embodiments, the electronic device 700 may include processing circuitry 702 coupled with network interface circuitry 704 for communicating over a wired interface (for example, an X2 interface, an S1 interface, and the like).

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processing circuitry 702 may include one or more processors. For example, the processing circuitry 702 may include circuitry such as, but not limited to, one or more single-core or multi-core processors 702a. The processor(s) 702a may include any combination of general-purpose processors and dedicated processors (e.g., graphics processors, application processors, digital signal processors, etc.). The processors 702a may be coupled with or may include computer-readable media 702b (also referred to as "CRM 702b," "memory 702b," "storage 702b," or "memory/storage 702b") and may be configured to execute instructions stored in the CRM 702b to enable various applications, tasks, threads, or operating systems to run on the electronic device 700.

The CRM 702b for one embodiment may include any combination of suitable volatile memory or non-volatile memory. The CRM 702b may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 702b may be shared among the various processors or dedicated to particular processors.

In some embodiments, the CRM 702b may include logic to implement IRP manager 204 or IRP agent 208 to perform the lifecycle management parameter modeling for VNFs as described herein.

Components of the processing circuitry 702 may be suitably combined in a single chip, a single chipset, or disposed on a same circuit board in some embodiments.

The network interface circuitry 704 may be one or more computer hardware components that connect electronic device 700 to one or more network elements, such as one or more servers within a core network via a wired connection. To this end, the network interface circuitry 704 may include one or more dedicated processors or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), or any other suitable network communications protocols.

In some embodiments, the electronic device 700 may be configured to perform one or more processes, techniques, or methods as described herein, or portions thereof. For example, the electronic device 700 may implement the flow/structure 500 of FIG. 5 or the flow/structure 600 of FIG. 6. In general, the processing circuitry 702 may construct messages for transmission, process received messages to determine attribute values or other information, and cause transmission of the messages by providing the generated message to the network interface circuitry 704. The network interface circuitry 704 may send/receive the messages over appropriate network connections.

Figure 8:
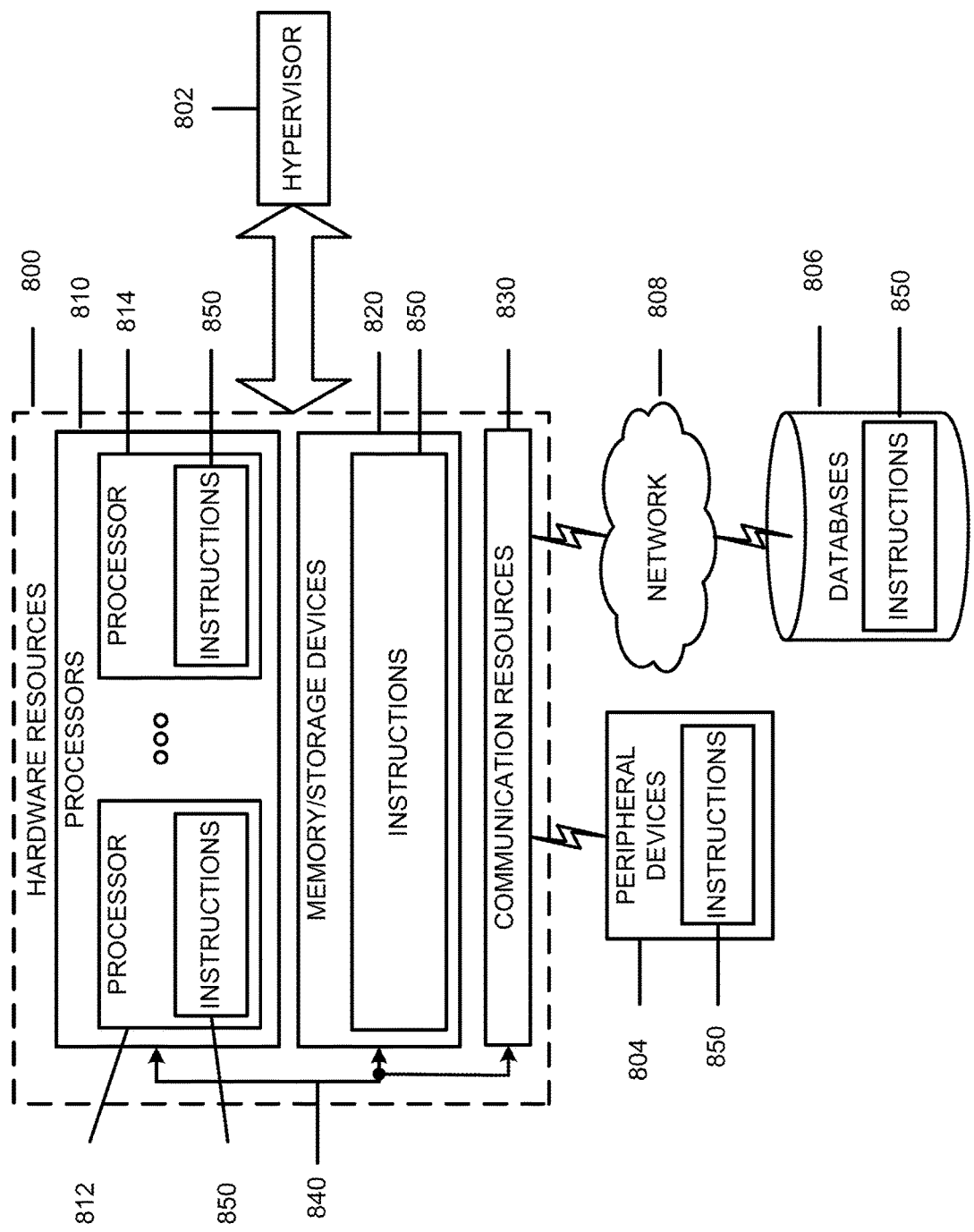
FIG. 8 illustrates hardware resources in accordance with some embodiments.

FIG. 8 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (for example, network function virtualization ("NFV")) is utilized, a hypervisor 802 may be executed to provide an execution environment for one or more network slices/sub-slices to utilize the hardware resources 800.

The processors 810 (for example, a CPU, a reduced instruction set computing ("RISC") processor, a complex instruction set computing ("CISC") processor, a graphics processing unit ("GPU"), a digital signal processor ("DSP") such as a baseband processor, an application specific integrated circuit ("ASIC"), a radio-frequency integrated circuit ("RFIC"), another processor, or any suitable combination thereof) may include, for example, a processor 812 and a processor 814. The processors may correspond to any processors of processing circuitry 702 or network interface circuitry 704 of FIG. 7. The memory/storage devices 820 may include main memory, disk storage, or any suitable combination thereof. The memory/storage devices 820 may include, but are not limited to, any type of volatile or non-volatile memory such as dynamic random access memory ("DRAM"), static random-access memory ("SRAM"), erasable programmable read-only memory ("EPROM"), electrically erasable programmable read-only memory ("EEPROM"), Flash memory, solid-state storage, etc. The memory/storage devices 820 may correspond to CRM 702*b* of FIG. 7.

The communication resources 830 may include interconnection or network interface components or other suitable devices to communicate with one or more peripheral devices 804 or one or more databases 806 via a network 808. For example, the communication resources 830 may include wired communication components (for example, for coupling via a Universal Serial Bus ("USB")), cellular communication components, near-field communication ("NFC") components, Bluetooth® components (for example, Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein.

The instructions 850 may cause the processors 810 to perform the operation flow/algorithmic structure 500, 600 or other operations of an EM, NM, or VNFM described herein.

The instructions 850 may reside, completely or partially, within at least one of the processors 810 (for example, within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

The resources described in FIG. 8 may also be referred to as circuitry. For example, communication resources 830 may also be referred to as communication circuitry 830. Some non-limiting examples are provided below.

Example 1 includes a network manager ("NM") having circuitry to: generate a create managed object ("MO") request to be sent to an element manager ("EM") to request creation of an MO instance ("MOI") for a managed object class, wherein the managed object class is to inherit attributes from a managed function information object class ("IOC"), the inherited attributes to include VNF descriptor ("VNFD") identifier ("ID") and a flavour ID; and process a notification, received from the EM, of creation of the MOI.

Example 2 includes the NM of example 1 or any other example, wherein the MO request is to request instantiation of a virtual network function ("VNF").

Example 3 includes the NM of example 2 or any other example, wherein the VNFD ID is an identifier of a VNFD on which the VNF is based, the VNFD to include a plurality of attributes to define deployment or operational behaviour requirements of the VNF.

Example 4 includes the NM of example 2 or any other example, wherein the flavour ID is an identifier of a deployment flavour ("DF") of the VNF, the DF to include a plurality of attributes to define a specific deployment version of the VNF.

Example 5 includes the NM of any one of examples 1-4 or any other example, wherein the managed object class corresponds to a mobility management entity function, a serving gateway function, a packet gateway function, a policy charging and rules function, or an evolved packet data gateway function.

Example 6 includes the NM of any one of examples 1-5 or any other example, wherein the circuitry is to cause an integration reference point ("IRP") manager of the NM to generate the create-MO request to be sent to an IRP agent of the EM.

Example 7 includes the NM any one of examples 1-6 or any other example, wherein the inherited attributes indicate lifecycle management ("LCM")-related parameters including the VNF descriptor ID and the flavour ID.

Example 8 includes the NM of any one of examples 1-4 or any other example, wherein the circuitry is to cause the create-MO request to be sent to the EM via a basic configuration management integration reference point management interface.

Example 9 includes an element manager ("EM") having circuitry to: process a managed object ("MO") creation request sent by a network manager ("NM") to request creation of an MO instance ("MOI") for a managed object class, wherein the managed object class is to inherit attributes from a managed function information object class ("IOC"), the inherited attributes to include a virtual network function descriptor ("VNFD") identifier ("ID") and a flavour ID; create and configure the MOI with the inherited attributes; and generate a notification to notify the NM of creation of the MOI.

Example 10 includes the EM of example 9, wherein the MO request is to request instantiation of a virtual network function ("VNF").

Example 11 includes the EM of example 10, wherein the VNFD ID is an identifier of a VNFD on which the VNF is based, the VNFD to include a plurality of attributes to define deployment or operational behavior requirements of the VNF.

Example 12 includes the EM of example 10, wherein the flavour ID is an identifier of a deployment flavour ("DF") of the VNF, the DF to include a plurality of attributes to define a specific deployment version of the VNF.

Example 13 includes the EM of any one of examples 9-12, wherein the managed object class is a network function IOC.

Example 14 includes the EM of any one of examples 9-13, wherein the circuitry is further to cause an integration reference point ("IRP") agent of the EM to process the create-MO request received from an IRP manager of the NM and create and configure the MOI.

Example 15 includes the EM of any one of examples 9-14, wherein the inherited attributes indicate lifecycle management ("LCM")-related parameters including the VNFD ID and the flavour ID.

Example 16 includes the EM of any one of examples 9-15, wherein the circuitry is to further cause the create-MO request to be sent to the EM via a basic configuration management integration reference point management interface.

Example 17 includes the EM of any one of examples 9-16, wherein the circuitry is to further cause the EM to instantiate a virtual network function ("VNF") based on the create-MO request.

Example 18 includes the EM of example 17, wherein to instantiate the VNF the circuitry is to: generate a create VNF request to be sent to a VNF Manager ("VNFM") with the VNFD ID to create a VNF identifier; process a create VNF response, received from the VNFM, with a VNF instance ID to indicate that the VNF identifier has been created; generate an instantiate VNF request to be sent to the VNFM with the VNF instance ID to instantiate the VNF; process an instantiate VNF response received from the VNFM with a lifecycle operation occurrence ID; process a first notification received from the VNFM with the VNF instance ID that indicates a start of VNF instantiation; and process a second notification received from the VNFM with the VNF instance ID to indicate a result of VNF instantiation.

Example 19 includes the EM of example 18, wherein the circuitry is to further configure the MOI with the VNF instance ID received from the VNFM.

Example 20 includes the EM of any one of examples 9-19, wherein the create MO request is to further include one or more additional attributes to be used to instantiate a virtual network function ("VNF").

Example 21 includes the EM of any one of examples 9-20, wherein the circuitry is to further: process a plurality of create-MO requests; and create a plurality of MOis that respectively correspond to the plurality of create MO requests.

Example 22 includes the EM of any one of examples 9-21, wherein the circuitry is to further: create a plurality of MOIs based on the create-MO requests.

Example 23 includes an element manager ("EM") comprising circuitry to: receive a managed object ("MO") creation request sent by a network manager ("NM") to request creation of an MO instance ("MOI") for a managed object class; determine lifecycle-related management ("LCM")-related parameters based on the MO creation request, the LCM-related parameters to include a virtual network function descriptor ("VNFD") identifier ("ID") and a flavour ID; create and configure the MOI with the LCM-related parameters; generate a notification to notify the NM of creation of the MOI; and send the notification to the NM.

Example 24 includes the EM of example 23, wherein the circuitry is to further interpret the MO request to request instantiation of a virtual network function ("VNF") and to transmit a plurality of messages to a virtual network function manager ("VNFM") to instantiate the VNF.

Example 25 includes the EM of example 23 or 24, wherein the processing circuitry is to determine the LCM-related attributes based on their inclusion in the MO creation request or on a relationship between the managed object class and a managed element information object class ("IOC"), managed function IOC, or virtualization information IOC.

Example 26 includes a network manager ("NM") comprising: means for generating a create managed object ("MO") request to be sent to an element manager ("EM") to request creation of an MO instance ("MOI") for a managed object class, wherein the managed object class is to inherit lifecycle management ("LCM")-related parameters from an information object class ("IOC"), the inherited LCM-related parameters to include VNF descriptor ("VNFD") identifier ("ID") and a flavour ID; and means for processing a notification, received from the EM, of creation of the MOI.

Example 27 includes the NM of example 26, wherein the MO request is to request instantiation of a virtual network function ("VNF").

Example 28 includes the NM of example 27, wherein the VNFD ID is an identifier of a VNFD on which the VNF is based, the VNFD to include a plurality of attributes to define deployment or operational behaviour requirements of the VNF.

Example 29 includes the NM of example 27, wherein the flavour ID is an identifier of a deployment flavour ("DF") of the VNF, the DF to include a plurality of attributes to define a specific deployment version of the VNF.

Example 30 includes the NM of any one of examples 27-29, wherein the notification of creation of the MOI is received by the NM before instantiation of the VNF and the NM further comprises: means for processing a notification of modified attribute values for the MOI, the notification of modified attribute values for the MOI to include a VNF instance identifier.

Example 31 includes one or more computer-readable media having instructions that, when executed, cause a network manager ("NM") to: generate a create managed object ("MO") request to be sent to an element manager ("EM") to request creation of an MO instance ("MOI") for a managed object class, wherein the managed object class is to inherit attributes from a managed function information object class ("IOC"), the inherited attributes to include VNF descriptor ("VNFD") identifier ("ID") and a flavour ID; and process a notification, received from the EM, of creation of the MOI.

Example 32 includes the one or more computer-readable media of example 31, wherein the MO request is to request instantiation of a virtual network function ("VNF").

Example 33 includes the one or more computer-readable media of example 32, wherein the VNFD ID is an identifier of a VNFD on which the VNF is based, the VNFD to include a plurality of attributes to define deployment or operational behaviour requirements of the VNF.

Example 34 includes the one or more computer-readable media of example 32, wherein the flavour ID is an identifier of a deployment flavour ("DF") of the VNF, the DF to include a plurality of attributes to define a specific deployment version of the VNF.

Example 35 includes the one or more computer-readable media of any one of examples 31-34, wherein the managed object class corresponds to a mobility management entity function, a serving gateway function, a packet gateway function, a policy charging and rules function, or an evolved packet data gateway function.

Example 36 includes the one or more computer-readable media of any one of examples 31-34, wherein the instructions, when executed, cause an integration reference point ("IRP") manager of the NM to generate the create-MO request to be sent to an IRP agent of the EM.

Example 37 includes the one or more computer-readable media any one of examples 31-34, wherein the inherited attributes indicate lifecycle management ("LCM")-related parameters including the VNF descriptor ID and the flavour ID.

Example 38 includes the one or more computer-readable media of any one of examples 31-34, wherein the instructions, when executed, are to cause the create-MO request to be sent to the EM via a basic configuration management integration reference point management interface.

Example 39 includes one or more computer-readable media having instructions that, when executed, cause an element manager ("EM") to: process a managed object ("MO") creation request sent by a network manager ("NM") to request creation of an MO instance ("MOI") for a managed object class, wherein the managed object class is to inherit attributes from a managed function information object class ("IOC"), the inherited attributes to include a virtual network function descriptor ("VNFD") identifier ("ID") and a flavour ID; create and configure the MOI with the inherited attributes; and generate a notification to notify the NM of creation of the MOI.

Example 40 includes the one or more computer-readable media of example 39, wherein the MO request is to request instantiation of a virtual network function ("VNF").

Example 41 includes the one or more computer-readable media of example 40, wherein the VNFD ID is an identifier of a VNFD on which the VNF is based, the VNFD to include a plurality of attributes to define deployment or operational behavior requirements of the VNF.

Example 42 includes the one or more computer-readable media of example 40, wherein the flavour ID is an identifier of a deployment flavour ("DF") of the VNF, the DF to include a plurality of attributes to define a specific deployment version of the VNF.

Example 43 includes the one or more computer-readable media of any one of examples 39-42, wherein the managed object class is a network function IOC.

Example 44 includes the one or more computer-readable media of any one of examples 39-42, wherein the instructions, when executed, cause an integration reference point ("IRP") agent of the EM to process the create-MO request received from an IRP manager of the NM and create and configure the MOI.

Example 45 includes the one or more computer-readable media of any one of examples 39-42, wherein the inherited attributes indicate lifecycle management ("LCM")-related parameters including the VNFD ID and the flavour ID.

Example 46 includes the one or more computer-readable media of any one of examples 39-42, wherein the instructions, when executed, are to cause the create-MO request to be sent to the EM via a basic configuration management integration reference point management interface.

Example 47 includes the one or more computer-readable media of any one of examples 39-42, wherein the instructions, when executed, are to cause the EM to instantiate a virtual network function ("VNF") based on the create-MO request.

Example 48 includes the one or more computer-readable media of example 47, wherein to instantiate the VNF the instructions, when executed, further cause the EM to: generate a create VNF request to be sent to a VNF Manager ("VNFM") with the VNFD ID to create a VNF identifier; process a create VNF response, received from the VNFM, with a VNF instance ID to indicate that the VNF identifier has been created; generate an instantiate VNF request to be sent to the VNFM with the VNF instance ID to instantiate the VNF; process an instantiate VNF response received from the VNFM with a lifecycle operation occurrence ID; process a first notification received from the VNFM with the VNF instance ID that indicates a start of VNF instantiation; and process a second notification received from the VNFM with the VNF instance ID to indicate a result of VNF instantiation.

Example 49 includes the one or more computer-readable media of example 48, wherein the instructions, when executed, further cause the EM to configure the MOI with the VNF instance ID received from the VNFM.

Example 50 includes the one or more computer-readable media of any one of examples 39-42, wherein the create MO request is to further include one or more additional attributes to be used to instantiate a virtual network function ("VNF").

Example 51 includes the one or more computer-readable media of any one of examples 39-42, wherein the instructions, when executed, further cause the EM to: process a plurality of create-MO requests; and create a plurality of MOIs that respectively correspond to the plurality of create MO requests.

Example 52 includes the one or more computer-readable media of any one of examples 39-42, wherein the instructions, when executed, further cause the EM to: create a plurality of MOIs based on the create-MO requests.

Example 53 includes an element manager ("EM") comprising: network interface circuitry to receive a managed object ("MO") creation request sent by a network manager ("NM") to request creation of an MO instance ("MOI") for a managed object class; and processing circuitry coupled with the network interface circuitry to: determine lifecycle-related management ("LCM")-related parameters based on the MO creation request, the LCM-related parameters to include a virtual network function descriptor ("VNFD") identifier ("ID") and a flavour ID; create and configure the MOI with the LCM-related parameters; and generate a notification to notify the NM of creation of the MOI; wherein the network interface circuitry is to send the notification to the NM.

Example 54 includes the EM of example 53, wherein the processing circuitry is to interpret the MO request to request instantiation of a virtual network function ("VNF") and control the network interface circuitry to transmit a plurality of messages to a virtual network function manager ("VNFM") to instantiate the VNF.

Example 55 includes the one or more computer-readable media of example 53 or 54, wherein the processing circuitry is to determine the LCM-related parameters based on their inclusion in the MO creation request or on a relationship between the managed object class and was managed element information object class ("IOC"), managed function IOC, or virtualization information IOC.

Example 56 includes a method comprising: generating a create managed object ("MO") request to be sent to an element manager ("EM") to request creation of an MO instance ("MOI") for a managed object class, wherein the managed object class is to inherit attributes from a managed function information object class ("IOC"), the inherited attributes to indicate VNF descriptor ("VNFD") identifier ("ID") and a flavour ID; and processing a notification, received from the EM, of creation of the MOI.

Example 57 includes the method of example 56, wherein the MO request is to request instantiation of a virtual network function ("VNF").

Example 58 includes the method of example 57, wherein the VNFD ID is an identifier of a VNFD on which the VNF is based, the VNFD to include a plurality of attributes to define deployment or operational behaviour requirements of the VNF.

Example 59 includes the method of example 57, wherein the flavour ID is an identifier of a deployment flavour ("DF")

of the VNF, the DF to include a plurality of attributes to define a specific deployment version of the VNF.

Example 60 includes the method of any one of examples 56-59, wherein the managed object class corresponds to a mobility management entity function, a serving gateway function, a packet gateway function, a policy charging and rules function, or an evolved packet data gateway function.

Example 61 includes the method of any one of examples 56-60, further comprising generating, with an integration reference point ("IRP") manager of the NM, the create-MO request to be sent to an IRP agent of the EM.

Example 62 includes the method of any one of examples 56-61, wherein the inherited attributes indicate lifecycle management ("LCM")-related parameters including the VNF descriptor ID and the flavour ID.

Example 63 includes the method of any one of examples 56-62, further comprising: sending the create-MO request to the EM via a basic configuration management integration reference point management interface.

Example 64 includes a method comprising: processing a managed object ("MO") creation request sent by a network manager ("NM") to request creation of an MO instance ("MOI") for a managed object class, wherein the managed object class is to inherit attributes from a managed function information object class ("IOC"), the inherited attributes to include a virtual network function descriptor ("VNFD") identifier ("ID") and a flavour ID; creating and configuring the MOI with the inherited attributes; and generating a notification to notify the NM of creation of the MOI.

Example 65 includes the method of example 64, wherein the MO request is to request instantiation of a virtual network function ("VNF").

Example 66 includes the method of example 65, wherein the VNFD ID is an identifier of a VNFD on which the VNF is based, the VNFD to include a plurality of attributes to define deployment or operational behavior requirements of the VNF.

Example 67 includes the method of example 65 or 66, wherein the flavour ID is an identifier of a deployment flavour ("DF") of the VNF, the DF to include a plurality of attributes to define a specific deployment version of the VNF.

Example 68 includes the method of any one of examples 64-67, wherein the managed object class is a network function IOC.

Example 69 includes the method of any one of examples 64-68, implementing an integration reference point ("IRP") agent of the EM to process the create-MO request received from an IRP manager of the NM and create and configure the MOI.

Example 70 includes the method of any one of examples 64-69, wherein the inherited attributes indicate lifecycle management ("LCM")-related parameters including the VNFD ID and the flavour ID.

Example 71 includes the method of any one of examples 64-70, further comprising sending the create-MO request to the EM via a basic configuration management integration reference point management interface.

Example 72 includes the method of any one of examples 64-71, further comprising instantiating a virtual network function ("VNF") based on the create-MO request.

Example 73 includes the method of example 72, wherein instantiating the VNF comprises: sending a create VNF request to a VNF Manager ("VNFM") with the VNFD ID to create a VNF identifier; processing a create VNF response, received from the VNFM, with a VNF instance ID to indicate that the VNF identifier has been created; sending an instantiate VNF request to the VNFM with the VNF instance ID to instantiate the VNF; processing an instantiate VNF response received from the VNFM with a lifecycle operation occurrence ID; processing a first notification received from the VNFM with the VNF instance ID that indicates a start of VNF instantiation; and processing a second notification received from the VNFM with the VNF instance ID to indicate a result of VNF instantiation.

Example 74 includes the method of example 73, further comprising configuring the MOI with the VNF instance ID received from the VNFM.

Example 75 includes the method of any one of examples 64-75, wherein the MO request includes one or more additional attributes to be used to instantiate a virtual network function ("VNF").

Example 76 includes the method of any one of examples 64-75, further comprising: processing a plurality of create-MO requests; and creating a plurality of MOIs that respectively correspond to the plurality of create MO requests.

Example 77 includes the method of any one of examples 64-76, further comprising: creating a plurality of MOIs based on the create-MO requests.

Example 78 includes a method comprising: receiving a managed object ("MO") creation request sent by a network manager ("NM") to request creation of an MO instance ("MOI") for a managed object class; determining lifecycle-related management ("LCM")-related parameters based on the MO creation request, the LCM-related parameters to include a virtual network function descriptor ("VNFD") identifier ("ID") and a flavour ID; creating and configuring the MOI with the LCM-related parameters; generate a notification to notify the NM of creation of the MOI; and sending the notification to the NM.

Example 79 includes the method of example 78, further comprising: interpreting the MO request to request instantiation of a virtual network function ("VNF"); and transmitting a plurality of messages to a virtual network function manager ("VNFM") to instantiate the VNF.

Example 80 includes the method of example 78 or 79, further comprising: determining the LCM-related parameters based on their inclusion in the MO creation request or a relationship between the managed object class and a managed element information object class ("IOC"), managed function IOC, or virtualization information IOC.

Example 81 includes an apparatus comprising means to perform one or more elements of a method described in or related to any of examples 54-80, or any other method or process described herein.

Example 82 includes one or more non-transitory computer-readable media comprising instructions to cause an electronic device, upon execution of the instructions by one or more processors of the electronic device, to perform one or more elements of a method described in or related to any of examples 54-80, or any other method or process described herein.

Example 83 includes an apparatus comprising logic, modules, or circuitry to perform one or more elements of a method described in or related to any of examples 54-80, or any other method or process described herein.

Example 84 includes an apparatus comprising: one or more processors and one or more computer-readable media comprising instructions that, when executed by the one or more processors, cause the one or more processors to perform a method described in or related to any of claims 54-80, or portions thereof.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed, cause a network manager ("NM") to:
generate a create managed object ("MO") request to be sent to an element manager ("EM") to request creation of an MO instance ("MOI") for a managed object class, wherein the managed object class is related to a managed function information object class ("IOC"), and wherein the managed object class is to inherit attributes from the managed function IOC, the inherited attributes to indicate VNF descriptor ("VNFD") identifier ("ID") and a flavour ID; and
process a notification, received from the EM, of creation of the MOI.

2. The one or more non-transitory, computer-readable media of claim 1, wherein the MO request is to request instantiation of a virtual network function ("VNF").

3. The one or more non-transitory, computer-readable media of claim 2, wherein the VNFD ID is an identifier of a VNFD on which the VNF is based, the VNFD to include a plurality of attributes to define deployment or operational behaviour requirements of the VNF.

4. The one or more non-transitory, computer-readable media of claim 2, wherein the flavour ID is an identifier of a deployment flavour ("DF") of the VNF, the DF to include a plurality of attributes to define a specific deployment version of the VNF.

5. The one or more non-transitory, computer-readable media of claim 1, wherein the managed object class corresponds to a mobility management entity function, a serving gateway function, a packet gateway function, a policy charging and rules function, or an evolved packet data gateway function.

6. The one or more non-transitory, computer-readable media of claim 1, wherein the instructions, when executed, cause an integration reference point ("IRP") manager of the NM to generate the create-MO request to be sent to an IRP agent of the EM.

7. The one or more non-transitory, computer-readable media of claim 1, wherein the inherited attributes indicate lifecycle management ("LCM")-related parameters including the VNF descriptor ID and the flavour ID.

8. The one or more non-transitory, computer-readable media of claim 1, wherein the instructions, when executed, are to cause the create-MO request to be sent to the EM via a basic configuration management integration reference point management interface.

9. One or more non-transitory, computer-readable media having instructions that, when executed, cause an element manager ("EM") to:
process a create managed object ("MO") request sent by a network manager ("NM") to request creation of an MO instance ("MOI") for a managed object class;
determine a managed function information object class ("IOC") to which the managed object class is related;
determine, based on the managed function IOC, attributes that the managed object class is to inherit, the inherited attributes to indicate a virtual network function descriptor ("VNFD") identifier ("ID") and a flavour ID;
create and configure the MOI with the inherited attributes; and
generate a notification to notify the NM of creation of the MOI.

10. The one or more non-transitory, computer-readable media of claim 9, wherein the MO request is to request instantiation of a virtual network function ("VNF").

11. The one or more non-transitory, computer-readable media of claim 10, wherein the VNFD ID is an identifier of a VNFD on which the VNF is based, the VNFD to include a plurality of attributes to define deployment or operational behavior requirements of the VNF.

12. The one or more non-transitory, computer-readable media of claim 10, wherein the flavour ID is an identifier of a deployment flavour ("DF") of the VNF, the DF to include a plurality of attributes to define a specific deployment version of the VNF.

13. The one or more non-transitory, computer-readable media of claim 9, wherein the managed object class is a network function.

14. The one or more non-transitory, computer-readable media of claim 9, wherein the instructions, when executed, cause an integration reference point ("IRP") agent of the EM to process the create-MO request received from an IRP manager of the NM and create and configure the MOL.

15. The one or more non-transitory, computer-readable media of claim 9, wherein the inherited attributes indicate lifecycle management ("LCM")-related parameters including the VNFD ID and the flavour ID.

16. The one or more non-transitory, computer-readable media of claim 9, wherein the instructions, when executed, are to cause the create-MO request to be sent to the EM via a basic configuration management integration reference point management interface.

17. The one or more non-transitory, computer-readable media of claim 9, wherein the instructions, when executed, are to cause the EM to instantiate a virtual network function ("VNF") based on the create-MO request.

18. The one or more non-transitory, computer-readable media of claim 17, wherein to instantiate the VNF the instructions, when executed, further cause the EM to:
generate a create VNF request to be sent to a VNF Manager ("VNFM") with the VNFD ID to create a VNF identifier;
process a create VNF response, received from the VNFM, with a VNF instance ID to indicate that the VNF identifier has been created;
generate an instantiate VNF request to be sent to the VNFM with the VNF instance ID to instantiate the VNF;
process an instantiate VNF response received from the VNFM with a lifecycle operation occurrence ID;
process a first notification received from the VNFM with the VNF instance ID that indicates a start of VNF instantiation; and
process a second notification received from the VNFM with the VNF instance ID to indicate a result of VNF instantiation.

19. A network manager ("NM") comprising:
means for generating a create managed object ("MO") request to be sent to an element manager ("EM") to request creation of an MO instance ("MOI") for a managed object class, wherein the managed object class is to inherit lifecycle management ("LCM")-related parameters based on a relationship between the managed object class and an information object class ("IOC"), the inherited LCM-related parameters to include VNF descriptor ("VNFD") identifier ("ID") and a flavour ID; and means for processing a notification, received from the EM, of creation of the MOI.

20. The NM of claim 19, wherein the MO request is to request instantiation of a virtual network function ("VNF") and the VNFD ID is an identifier of a VNFD on which the VNF is based, the VNFD to include a plurality of attributes to define deployment or operational behaviour requirements of the VNF.

21. The NM of claim 19, wherein the MO request is to request instantiation of a virtual network function ("VNF") and the flavour ID is an identifier of a deployment flavour ("DF") of the VNF, the DF to include a plurality of attributes to define a specific deployment version of the VNF.

22. The NM of claim 19, wherein the notification of creation of the MOI is received by the NM before instantiation of the VNF and the NM further comprises: means for processing a notification of modified attribute values for the MOI, the notification of modified attribute values for the MOI to include a VNF instance identifier.

23. An element manager ("EM") comprising:
network interface circuitry to receive a create managed object ("MO") request sent by a network manager ("NM") to request creation of an MO instance ("MOI") for a managed object class; and processing circuitry coupled with the network interface circuitry to:
determine lifecycle-related management ("LCM")-related parameters based on the create MO request and an association of the LCM-related parameters with an information object class ("IOC"), the LCM-related parameters to include a virtual network function descriptor ("VNFD") identifier ("ID") and a flavour ID;

create and configure the MOI with the LCM-related parameters; and generate a notification to notify the NM of creation of the MOI;

wherein the network interface circuitry is to send the notification to the NM.

24. The EM of claim 23, wherein the processing circuitry is to interpret the MO request to request instantiation of a virtual network function ("VNF") and control the network interface circuitry to transmit a plurality of messages to a virtual network function manager ("VNFM") to instantiate the VNF.

25. The EM of claim 23, wherein the IOC is a managed element IOC, managed function IOC, or virtualization information IOC.

* * * * *